United States Patent [19]
Tarnow et al.
[11] 3,924,147
[45] Dec. 2, 1975

[54] BRUSHHOLDERS AND ANCILLARY COMPONENTS MOUNTED ON A PRINTED CIRCUIT BOARD

[75] Inventors: Virgil K. Tarnow; Kenneth E. Doshier, both of Rockford, Ill.

[73] Assignee: Barber-Colman Company, Rockford, Ill.

[22] Filed: Jan. 2, 1974

[21] Appl. No.: 429,751

[52] U.S. Cl. .................................... 310/68; 310/239
[51] Int. Cl.$^2$ .......................................... H02K 11/00
[58] Field of Search ........... 310/240, 68, 239, 68 D, 310/241, 71, 242, 72, 243, 245, 220, 221, 222, DIG. 6; 318/331, 345; 219/85

[56] References Cited
UNITED STATES PATENTS

| | | | |
|---|---|---|---|
| 3,194,994 | 7/1965 | Latta | 310/239 |
| 3,329,840 | 7/1967 | Binder | 310/68 |
| 3,422,339 | 1/1969 | Baker | 310/68 |
| 3,527,972 | 9/1970 | Franz | 310/239 |
| 3,602,793 | 8/1971 | Grozinger | 310/68 |
| 3,641,374 | 2/1972 | Sato | 310/68 |
| 3,760,211 | 9/1973 | Cotton | 310/242 |
| 3,792,298 | 2/1974 | Hamman | 310/242 |

*Primary Examiner*—R. Skudy

[57] ABSTRACT

Electrically conductive brushholders, terminals and other electrical components on one side of an insulating plate are retained on the plate and connected into a printed circuit on the opposite side of the plate by portions extending through holes in the plate and soldered to the printed circuitry to form a subassembly to be mounted in a commutator type motor so that brushes in the brushholders can deliver current from an external supply to the commutator.

7 Claims, 12 Drawing Figures

BRUSHHOLDERS AND ANCILLARY COMPONENTS MOUNTED ON A PRINTED CIRCUIT BOARD

BACKGROUND OF THE INVENTION

It is sometimes desirable to employ ancillary electrical components with a brush and commutator type electric motor. Such ancillary components may convert alternating to direct current to enable a DC motor to be operated on an AC power supply. They may act as filters to prevent electrical noise generated by a motor from being propagated over the power lines. These and other reasons for use of such ancillary components are well known. When predetermined ancillary components are always used in conjunction with a given motor, it is convenient to package them with the motor. There are several known means for accomplishing this result. Some, such as in Saslow et al U.S. Pat. No. 3,341,724, produce unacceptably large packages. While printed circuits have been used to mount the ancillary components, as in Turley et al U.S. Pat. No. 3,225,232, and while brushholders and ancillary components have been mounted upon the same insulating plate, as in Soeda U.S. Pat. No. 3,457,486, no one has employed printed circuit techniques to mount the brushholders along with the ancillary components and to form the connections therebetween.

SUMMARY OF THE INVENTION

Brushholders are mounted on printed circuit boards in the same manner as the ancillary components, using automatic insertion and wave soldering to reduce cost. The resulting sub-assembly generally occupies no more space in the motor casing than brush mounting means alone. By use of a unitary circuit inside the motor casing, the possibility of incorrect installation is greatly reduced, loss or misplacement of the ancillary circuits is eliminated, and installation time is reduced to a minimum.

DESCRIPTION OF THE PREFERRED EMBODIMENTS

The description of the following preferred embodiments are exemplary only and do not define the scope of the invention, which is limited solely by the claims. Those skilled in the art will be aware of many equivalents and modifications that could be made.

Figure 1:
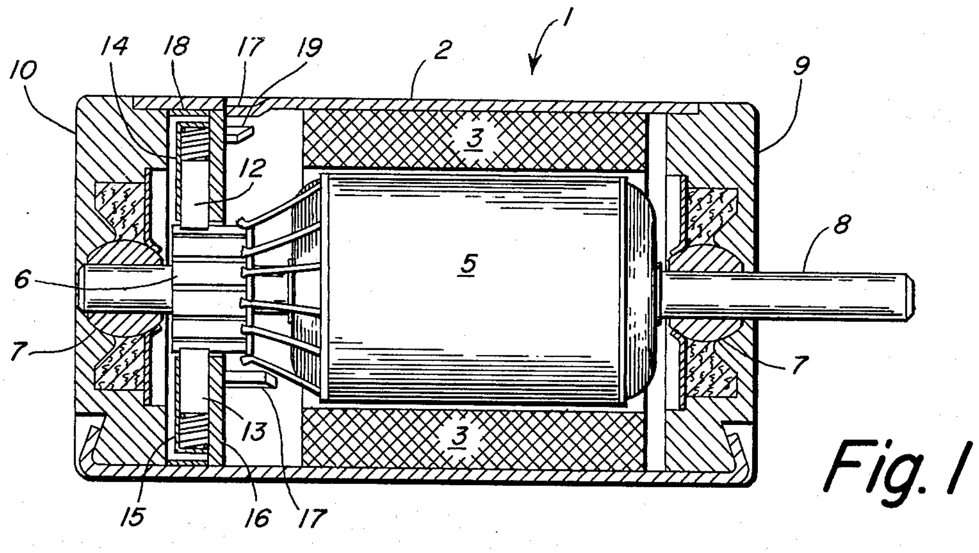
FIG. 1 is a longitudinal cross-section of a permanent magnet type DC motor.

FIG. 1 shows a cross-section of a typical permanent magnet type DC motor. A stator 1 comprises a cylindrical magnetic casing 2 and, mounted on the inside thereof, permanent magnets 3 providing alternating north and south poles. A wound rotor 5, a commutator 6 and spaced spherical bearings 7 are mounted on a shaft 8. The bearings are retained in end bells 9, 10 that close the ends of the casing 2. A pair of brushes 12, 13 are guided by brushholders 14, 15 into engagement with the commutator 6 and conduct direct current to and from the commutator. The brushholders are mounted on and insulated from each other by a mounting plate 16 held between abutments 17 lanced from casing 2 and a spacer 18 abutting end bell 10. The plate is located in a predetermined relation to the magnets 3 by a key 19 lanced from the casing 2.

Figure 2:
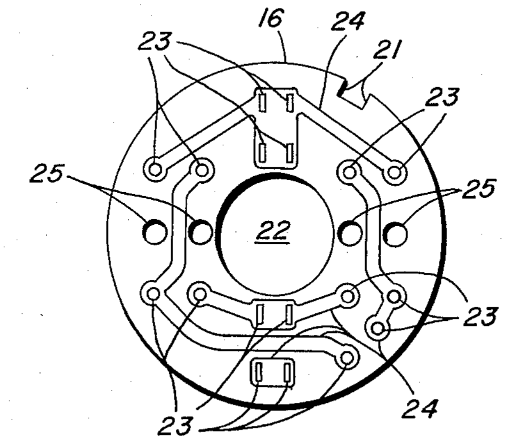
FIG. 2 is a plan view of the printed circuit on the brushholder mounting plate, as employed in one embodiment of this invention.
Figure 3:
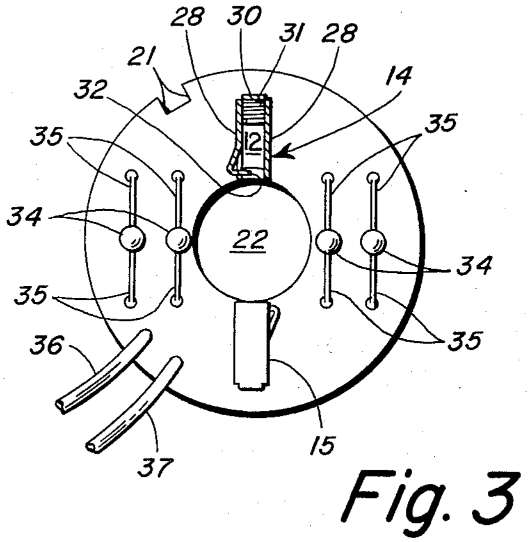
FIG. 3 is a plan view of a sub-assembly according to said one embodiment of the invention. One brushholder is sectioned.
Figure 5:
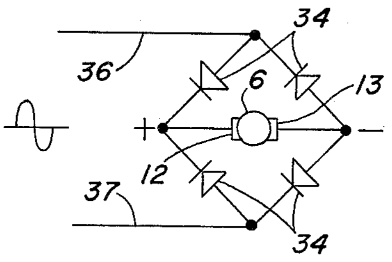
FIG. 5 is a circuit diagram of the rectifier bridge produced by FIGS. 2 and 3.
Figure 4:
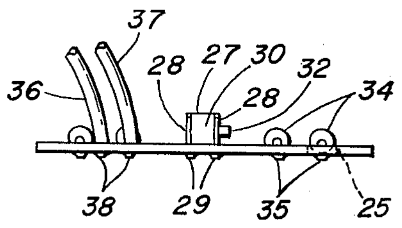
FIG. 4 is an elevation of the sub-assembly shown in plan in FIG. 3.

FIG. 2 shows the insulating plate 16 in plan with a keyway 21 to engage the key 19, a central opening 22 to clear the commutator 6, a plurality of apertures 23 in predetermined relationship through the plate, conducting metal surfaces 24 interconnecting the apertures in a predetermined pattern on one side of the plate, and clearance holes 25. The conducting surfaces are preferably formed by printed circuit techniques. FIG. 3 shows brushholders 14, 15 mounted upon the opposite side of insulating plate 16. The metal brushholder 14, as best seen in FIG. 3, comprises a top 27 and depending side walls 28, the sides and top forming a U-shaped channel. Projections 29 extending downward from sides 28 are inserted through respective ones of said apertures 23 to the associated conducting metal surfaces 24, to which they are soldered, thus serving to mount the brushholder rigidly on the plate and to conduct current from the brushholder to the conducting surfaces. The top 27, sides 28 and plate 16 define an enclosure closely receiving and guiding the brush 12. An end portion 30 depending from the top 27 closes the outer end of the brushholder. A spring 31 retained in the brushholder between the end portion 30 and brush 12 biases the brush outward from the inner end of the brushholder toward engagement with the commutator 6 and forms an electrical connection between the brush and the brushholder. Prior to assembly of the motor, the brush is restrained from outward movement by a bendable or frangible tab 32 integral with one of the side walls 28. The brushholder 15 is similar and is assembled in spaced axial alignment with brushholder 14 along an extended diameter of, and on the opposite side of, the central opening 22. Diode rectifiers 34 have leads 35 for conducting current to and from the rectifiers. The leads are inserted through predetermined ones of the apertures 23 to the communicating conducting surfaces 24, to which they are soldered. The leads serve not only to conduct current between the surfaces and through the diodes, but also to rigidly mount the diodes on the plate, preferrably with the diodes positioned to be partially within the clearance holes 25, as seen in phantom in FIG. 4. Terminals, shown as insulated wires 36, 37, have conductive ends 38 inserted through preselected ones of the apertures 23 to the corresponding conducting surfaces 24, to which they are soldered. The conducting surfaces 24 to which the various projections 29, conductors 35 and ends 38 are soldered are such that the brushes 12, 13, through springs 31 and brushholders 14, 15, are connected with the diodes 34 and the terminals 36, 37 to form a conventional rectifier bridge circuit, as shown in FIG. 5, the commutator 6 being external to the sub-assembly and shown only for reference purposes. The terminals 36, 37 are the inputs, the brushes 12, 13 are the outputs, and the rectifiers 34 are the arms of the bridge. Such a circuit is used to operate a DC motor from an AC supply.

Figure 6:
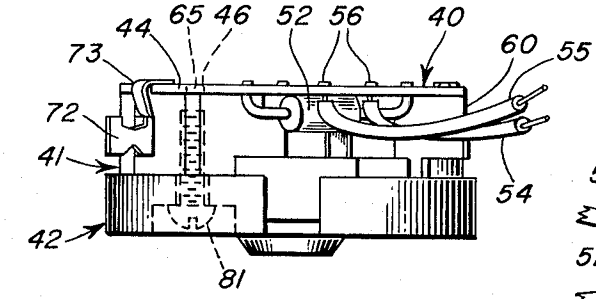
FIG. 6 is an elevation of a sub-assembly according to another embodiment of the invention.
Figure 7:
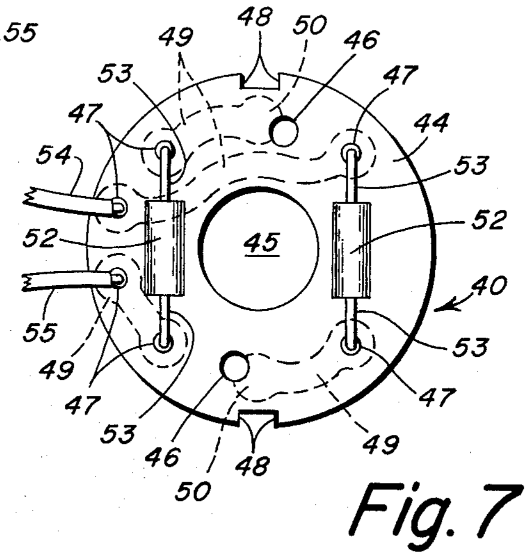
FIG. 7 is a plan view of a printed circuit board sub-assembly used in FIG. 6.

FIG. 6 shows another embodiment of this invention comprising a printed circuit board sub-assembly 40, a brushholder subassembly 41, and an end bell sub-assembly 42. The printed circuit board sub-assembly, shown in FIG. 7, comprises an insulting plate 44 having a central opening 45 to clear a commutator 6, a pair of locating holes 46, a plurality of apertures 47 in predetermined relationship, and a pair of notches 48 in the outer edge. One side of the plate 44, metal conducting surfaces 49 are present in a predetermined pattern interconnecting the apertures 47 and forming pads 50 adjacent said notches 48 as by printed circuit techniques. These surfaces are shown in phantom in FIG. 7. Inductors 52 are located on the side opposite the printed circuits with leads 53 inserted through pre-selected apertures 47 to predetermined ones of said conducting surfaces 49, to which they are soldered. Terminals, shown as insulated wires 54, 55, have conducting ends 56 inserted through respective ones of the apertures 47 and soldered to the associated surfaces 49.

Figure 8:
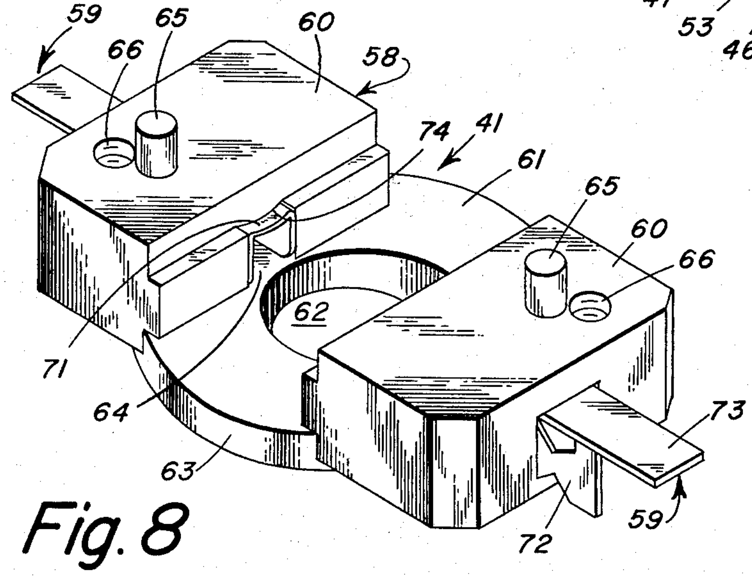
FIG. 8 is an isometric view of a brushholder sub-assembly employed in FIG. 6.
Figure 9:
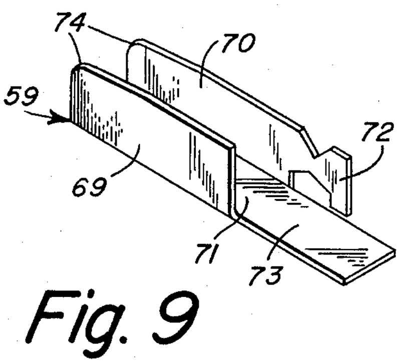
FIG. 9 is an isometric view of a brushholder incorporated in FIG. 8.

The brushholder sub-assembly 41, as seen in FIG. 8, comprises an insulating housing 58 and a pair of brushholders 59. The housing has a pair of identical blocks 60 in spaced diametrically opposed relationship on a locating ring 61. A central opening 62 in the ring is adapted to clear the commutator 6, while the outer circumferential wall 63 is adapted to locate the housing radially, as explained later. The blocks 60 have passages 64 therethrough aligned with a diameter of the ring 61 to receive and retain the brushholders 59. The blocks also have locating projections 65 to fit snuggly into holes 46 in the printed circuit board sub-assembly 40, and a threaded hole 66 therethrough. The metal brushholder 59 is shown separately in FIG. 9. It comprises a pair of side walls 69, 70 and a connecting wall 71. The side wall 70 has a bendable portion 72 extending from one end, which is to become the outer end, and the connecting wall 71 has a bendable projection 73 extending from the same end. The corners 74 of the side walls at the inner end are rounded to ease insertion into the passages 64. The brushholder 59 is inserted into the passage 64 with the connecting wall 71 upward, as shown in FIG. 8, and with the portion 72 and projection 73 extending beyond the end of the block 60. As the brushholder is inserted into the passage, the connecting wall 71 is depressed by a protrusion 74 into the passage 64, whereby the brushholder is secured in the passage.

Figure 10:
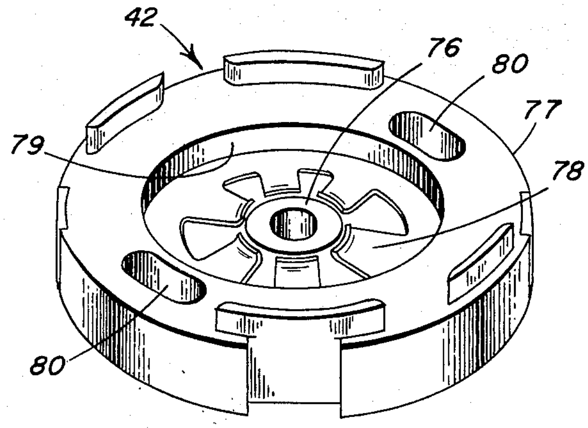
FIG. 10 is an isometric view of an end bell sub-assembly used in FIG. 6.

In the end bell sub-assembly 42, shown in FIG. 10, a spherical bearing 76 for a rotor shaft is retained in the end bell 77 by a spring washer 78. A locating recess defined by a pheripheral cylindrical wall 79 is adapted to snuggly receive the outer circumferential wall 63 on the brushholder sub-assembly 41. A pair of slots 80 are adapted to loosely receive screws 81, shown in phantom in FIG. 6.

The printed circuit board sub-assembly 40 is placed on the blocks 60 with the electrical components (inductors 52) and terminals 54, 55 facing the brushholder assembly 41 and with the locating holes 46 interfitting with the locating projections 65, as seen in FIG. 6. The projections 73 are bent up over plate 44 into contact with the pads 50, where they are soldered to hold the printed circuit board and brushholder sub-assemblies in predetermined fixed relationship and to provide electrical connections between the brushholders 59 and the pads 50. The end bell sub-assembly 42 is then positioned on the brushholder sub-assembly 41 with the peripheral cylindrical wall 79 surrounding the outer circumferential wall 63 of locating ring 61. Screws 81 are inserted through slots 80 and screwed into threaded holes 66 to retain the brushholders 59 in adjustable fixed relation to end bell 77 and ultimately to the poles 3 on the stator 1 of a motor, as in FIG. 1.

Figure 11:
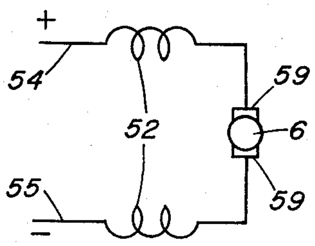
FIG. 11 is a circuit diagram showing the series circuit involved in FIG. 6.

After the complete sub-assembly has been incorporated into a motor along with a rotor 5 and its attendant commutator 6, a brush such as 12, 13 is inserted in each brushholder 59 and biased into engagement with the commutator by a spring 31, which abuts the tab 72 after the tab has been bent to close the outer end of the brushholder over the spring. This is similar to the construction shown and described with reference to FIGS. 1 and 3. When the motor assembly is complete, a series circuit from positive terminal 54 to negative terminal 55 is provided through the inductors 52 and brushholders 59 to and from the commutator 6, as shown in FIG. 11. This circuit is used to prevent or hinder noise generated by arcing between the brushes and the commutator from being propagated over the supply lines (not shown).

Figure 12:
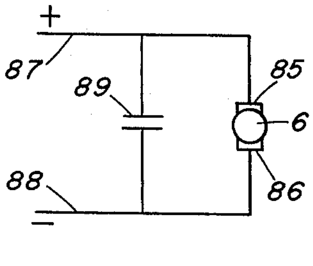
FIG. 12 is a circuit diagram of a parallel circuit that could be used in an embodiment of this invention.

FIG. 12 shows a parallel circuit that may also be used to suppress noise. It shows a commutator 6 engaged by brushes 85, 86 connected to positive and negative terminals 87, 88 respectively. A noise suppressing capacitor 89 is connected between terminals 87, 88 in a parallel circuit.

The insertion of brushholders, electrical components and terminals into the circuit boards is accomplished by automatic insertion techniques, while the making of soldered connections is accomplished by automatic wave soldering techniques.

We claim:

1. A motor sub-assembly comprising an insulating plate, a current conducting metal surface on a first side of said plate, a current conducting brushholder adjacent a second side of said plate and adapted to receive and guide a brush, a projection integral with said brushholder and extending through the insulating plate to said current conducting surface, a noise suppressor adjacent said second side, a conductor from the noise suppressor to said current conducting surface, and soldered connections rigidly joining the projection and said conductor to the conducting surface, said soldered connections retaining the brushholder and said noise suppressor on said plate and conducting current between the conducting surface and the respective projection and conductor.

2. A motor sub-assembly comprising an insulating plate, a plurality of apertures in a predetermined relationship through said plate, current conducting metal surfaces interconnecting the apertures in a predetermined pattern on a first side of said plate, a pair of current carrying brushholders located in spaced axial alignment on a second side of said plate, a current conducting projection from each of said brushholders passing through respective ones of said apertures to the associated current conducting surfaces, a pair of terminals on said second side of the plate, a current conducting end on each of said terminals and extending through pre-selected ones of the apertures to the corresponding current conducting surfaces, at least one electrical component on said second side and having a pair of conductors inserted through predetermined ones of the apertures to communicating ones of said current conducting surfaces, and soldered junctions rigidly joining the projections, ends and conductors to said respective conducting surfaces, said soldered junctions conducting current between the conducting surfaces and the respective projections, ends and conductors to form predetermined electrical circuits between the terminals and said brushholders, said electrical circuits comprising a noise suppressor.

3. A motor sub-assembly according to claim 2 wherein said noise suppressor comprises an inductor in series between one of the terminals and one of the brushholders.

4. A motor sub-assembly according to claim 2 wherein said noise suppressor comprises a capacitor connected between the terminals.

5. A motor sub-assembly comprising an insulating plate, a plurality of apertures in a predetermined relationship through said plate, current conducting metal surfaces interconnecting the apertures in a predetermined pattern on a first side of said plate, a pair of current conducting brushholders, an insulated housing on a second side of said plate, aligned passages in the housing receiving respective ones of said brushholders, interfitting means keying the housing and plate in predetermined relation, a current conducting projection from each of the brushholders passing through respective ones of said apertures to the associated current surfaces, a pair of terminals on said second side of the plate, a current conducting end on each of said terminals and extending through pre-selected ones of the apertures to the corresponding current conducting surfaces, at least one electrical component on said second side and having a pair of conductors inserted through predetermined ones of the apertures to communicating ones of said current conducting surfaces, and solder junctions between said current conducting surfaces and the respective projections, ends and conductors, whereby said housing, terminals and component are rigidly mounted on the plate and said current conducting surfaces interconnect said brushholders, terminals and component to form a predetermined electrical circuit between the terminals and said brushholders.

6. A motor sub-assembly according to claim 5 additionally comprising an end bell, and means attaching said housing to the end bell in predetermined fixed relation.

7. A motor sub-assembly acccording to claim 5 additionally comprising a protrusion into one of the passages to depress a wall of said received brushholder to retain the brushholder in said passage.

* * * * *